United States Patent
Girthar et al.

(10) Patent No.: US 10,985,410 B2
(45) Date of Patent: Apr. 20, 2021

(54) PLANT-SOIL BATTERY

(71) Applicant: DONGGUK UNIVERSITY INDUSTRY—ACADEMIC COOPERATION FOUNDATION, Seoul (KR)

(72) Inventors: Sunil Kumar Girthar, Seoul (KR); Hee-Chang Jeon, Seoul (KR); Tae-Won Kang, Seoul (KR)

(73) Assignee: DONGGUK UNIVERSITY INDUSTRY-ACADEMIC COOPERATION FOUNDATION, Seoul (KR)

( * ) Notice: Subject to any disclaimer, the term of this patent is extended or adjusted under 35 U.S.C. 154(b) by 328 days.

(21) Appl. No.: 16/092,983

(22) PCT Filed: Oct. 13, 2016

(86) PCT No.: PCT/KR2016/011477
§ 371 (c)(1),
(2) Date: Oct. 11, 2018

(87) PCT Pub. No.: WO2017/065512
PCT Pub. Date: Apr. 20, 2017

(65) Prior Publication Data
US 2019/0181507 A1    Jun. 13, 2019

(30) Foreign Application Priority Data

Oct. 13, 2015  (KR) .......... 10-2015-0142729
Oct. 13, 2016  (KR) .......... 10-2016-0132496

(51) Int. Cl.
| | | |
|---|---|---|
| H01M 10/36 | (2010.01) | |
| H01M 14/00 | (2006.01) | |
| A01G 9/02 | (2018.01) | |
| A01G 24/20 | (2018.01) | |
| H01M 8/16 | (2006.01) | |
| A01G 24/00 | (2018.01) | |
| A01G 7/00 | (2006.01) | |

(52) U.S. Cl.
CPC .......... *H01M 10/36* (2013.01); *A01G 9/02* (2013.01); *A01G 24/00* (2018.02); *A01G 24/20* (2018.02); *H01M 14/00* (2013.01); *A01G 7/00* (2013.01); *H01M 8/16* (2013.01)

(58) Field of Classification Search
None
See application file for complete search history.

(56) References Cited

U.S. PATENT DOCUMENTS

| | | | |
|---|---|---|---|
| 8,846,266 B2 * | 9/2014 | Scott | H01M 8/083 429/505 |
| 2003/0044964 A1 * | 3/2003 | Cheung | C05F 11/08 435/254.2 |
| 2013/0017457 A1 * | 1/2013 | Vaari | H01M 4/8828 429/401 |
| 2017/0077541 A1 * | 3/2017 | Togo | H01M 8/04201 |

FOREIGN PATENT DOCUMENTS

| | | |
|---|---|---|
| JP | 2007-28907 A | 2/2007 |
| JP | 2009-163914 A | 7/2009 |
| KR | 10-2013-0050577 A | 5/2013 |
| KR | 10-2015-0015623 A | 2/2015 |
| KR | 10-2015-0081873 A | 7/2015 |
| WO | WO 2008/127109 A1 | 10/2008 |

OTHER PUBLICATIONS

International Search Report for PCT/KR2016/011477 dated Feb. 10, 2017.
Office action dated Sep. 26, 2017 from Korean Patent Office in a counterpart Korean Patent Application No. 10-2016-0132496 (all the cited references are listed in this IDS.) (English translation is submitted herewith.).

* cited by examiner

*Primary Examiner* — Rena Dye Cronin
(74) *Attorney, Agent, or Firm* — The PL Law Group, PLLC

(57) ABSTRACT

A plant-soil battery includes a plant body, a soil layer in which the plant body is planted, an anode electrode disposed in the soil layer and including microorganisms that degrade glucose discharged from the plant body to generate electrons, and a cathode electrode disposed in the soil layer to receive the electrons. The plant-soil battery is capable of supplying energy for 24 hours a day, is harmless to the environment, can be easily moved and installed, and has an adjustable generating capacity.

6 Claims, 3 Drawing Sheets

PLANT-SOIL BATTERY

CROSS REFERENCE TO RELATED APPLICATIONS AND CLAIM OF PRIORITY

This application claims benefit under 35 U.S.C. 119(e), 120, 121, or 365(c), and is a National Stage entry from International Application No. PCT/KR2016/011477, filed Oct. 13, 2016, which claims priority to the benefit of Korean Patent Application No. 10-2015-0142729 filed on Oct. 13, 2015 and 10-2016-0132496 filed on Oct. 13, 2016 in the Korean Intellectual Property Office, the entire contents of which are incorporated herein by reference.

TECHNICAL FIELD

The present invention relates to a plant-soil battery.

BACKGROUND ART

A microbial fuel battery is a device for converting reduction power generated during energy metabolism of microorganisms into electric energy, and is currently in the spotlight as an energy generation medium friendly to the environment. In general, the microbial fuel battery includes a negative electrode portion and a positive electrode portion.

In recent years, in order to enhance an energy amount of battery output from the microbial fuel battery, studies into an alteration of materials for electrodes disposed in each of the cathode electrode portion and anode electrode portion, increase in an surface area of the electrodes, control of an interval between the electrodes, improvement of catalytic efficiency, increase in conductivity of an electrolyte, and modification of a structure, material and/or thickness of a cation-exchange membrane have been actively conducted.

However, such a microbial fuel battery is usually disposable and has a difficulty in practical use thereof due to a problem in treatment of the electrolyte.

Further, since a conventional microbial fuel battery has used waste water as a medium for generating electrical energy, problems of foul smell and chemical abrasion of the electrodes should be solved when applying odorous waste water such as livestock manure.

Korean Patent Laid-Open Publication No. 2013-0050577 discloses a microbial fuel battery device including a separation film for water treatment and a water treatment method using the same.

SUMMARY

It is an object of the present invention to provide a plant-soil battery which has a continuous structure based on soil in which plants grow and is capable of stably and smoothly generating a current.

Another object of the present invention is to provide a plant-soil battery which is capable of obtaining an energy source from eco-friendly materials and plants while not causing a problem such as bad odor.

1. A plant-soil battery, including:
a plant body;
a soil layer in which the plant body is planted;
an anode electrode disposed in the soil layer and including microorganisms which degrade glucose discharged from the plant body to generate electrons; and
a cathode electrode disposed in the soil layer to receive the electrons.

2. The plant-soil battery according to the above 1, wherein the soil layer includes a weak acidic electrolyte added thereto.

3. The plant-soil battery according to the above 1, wherein the electrolyte is in a liquid state.

4. The plant-soil battery according to the above 2, wherein the soil layer further includes galactose as well as a leaf extract containing galactosidase.

5. The plant-soil battery according to the above 1, wherein the soil layer includes livestock manure.

6. The plant-soil battery according to the above 1, wherein the soil layer includes solid livestock manure.

7. The plant-soil battery according to the above 1, wherein the anode electrode is an iron electrode and the cathode electrode is an electrode including a carbon material.

8. The plant-soil battery according to the above 1, wherein the anode electrode is a stainless steel electrode and the cathode electrode is an electrode including a carbon material.

9. The plant-soil battery according to the above 1, wherein the anode electrode is an electrode including a carbon material, and the cathode electrode is an electrode including a carbon material wherein surface functional groups of the cathode electrode are subjected to negative ionization.

10. The plant-soil battery according to the above 1, wherein the anode electrode and the cathode electrode are each independently formed in a cylinder shape or a plate shape.

11. The plant-soil battery according to the above 1, wherein the anode electrode is formed in a mesh cylinder shape, and is disposed in the soil layer so that a part of roots of the plant body is located inside the anode electrode.

12. The plant-soil battery according to the above 11, wherein the plant body is planted in an inner region of a cylinder cross-section of the anode electrode.

13. The plant-soil battery according to the above 11, further including a support wire to surround the anode electrode.

14. The plant-soil battery according to the above 1, wherein the cathode electrode is formed in a cylinder shape which is located at a predetermined distance spaced apart from the anode electrode to surround the same.

15. The plant-soil battery according to the above 1, wherein the cathode electrode is formed in a mesh cylinder shape, and further includes a support wire to surround the cathode electrode.

16. The plant-soil battery according to the above 1, wherein the anode electrode and the cathode electrode are in contact with each other with a separation film interposed therebetween.

17. The plant-soil battery according to the above 1, including a plurality of mesh cylinder-shaped anode electrodes and mesh cylinder-shaped cathode electrodes, wherein the anode electrodes and the cathode electrodes are disposed alternately with each other.

18. A plant-soil battery, including:
a plant body;
a soil layer in which the plant body is planted;
a mesh cylinder-shaped anode electrode disposed in the soil layer so that a part of roots of the plant body is located inside the anode electrode, and including microorganisms which degrade glucose discharged from the plant body to generate electrons; and
a mesh cylinder-shaped cathode electrode disposed in the soil layer to receive the electrons, which is located at a predetermined distance spaced apart from the anode electrode to surround the same.

19. The plant-soil battery according to the above 18, wherein the soil layer further includes galactose as well as a leaf extract containing galactosidase.

20. The plant-soil battery according to the above 19, wherein the soil layer further includes an antioxidant added thereto.

21. The plant-soil battery according to the above 18, further including support wires to surround the anode electrode and the cathode electrode, respectively.

22. The plant-soil battery according to the above 18, wherein the anode electrode and the cathode electrode are in contact with each other with a separation film interposed therebetween.

23. A plant-soil battery, including:
a plant body;
a soil layer in which the plant body is planted;
an anode electrode disposed in the soil layer with being in contact therewith, and including microorganisms which degrade glucose discharged from the plant body to generate electrodes; and
a cathode electrode separated from the soil layer by a cation-exchange membrane to receive the electrons.

24. The plant-soil battery according to the above 23, wherein the soil layer includes livestock manure.

25. The plant-soil battery according to the above 24, wherein the cation-exchange membrane is one selected from the group consisting of clay and loess.

26. The plant-soil battery according to the above 25, wherein the cation-exchange membrane further includes at least one electrolyte selected from the group consisting of ammonium chloride, potassium hydroxide and zinc chloride.

27. The plant-soil battery according to the above 23, further including a first auxiliary soil layer, which is in contact with the anode electrode and includes at least one selected from the group consisting of a weak acidic electrolyte, galactose as well as a leaf extract containing galactosidase, blueberries, honey and livestock manure.

28. The plant-soil battery according to the above 23, further including a second auxiliary soil layer, which is in contact with the cathode electrode and includes acid, and oxidant.

The plant-soil battery of the present invention may continuously supply energy for 24 hours and is harmless to the environment, thereby replacing existing eco-friendly batteries such as solar cells, wind power generation batteries and the like.

The plant-soil battery of the present invention may be easily moved and installed in a form of a flowerpot. Further, the plant-soil battery may be simply manufactured, thus having economic advantages in aspects of manufacturing costs.

The plant-soil battery of the present invention may easily control power generation capacity by altering plants and soil, or adjusting a size of the flowerpot.

DETAILED DESCRIPTION

Figure 1:
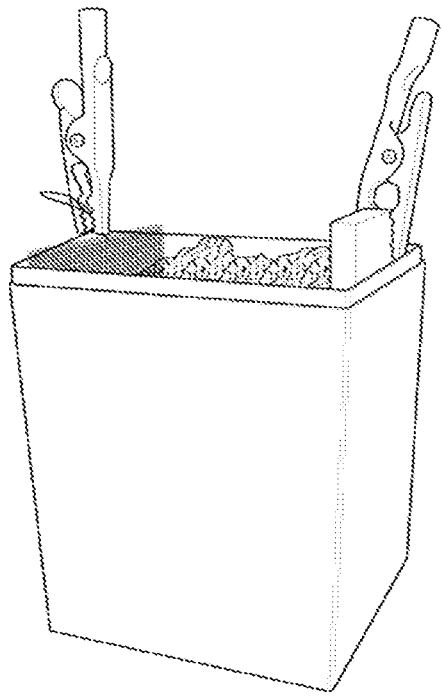
FIG. 1 is a photograph illustrating a plate-shaped anode electrode and a carbon rod-shaped cathode electrode disposed in a soil layer according to one embodiment of the present invention.

The present invention discloses a plant-soil battery that includes: a plant body; a soil layer in which the plant body is planted; an anode electrode disposed in the soil layer and including microorganisms which degrade glucose discharged from the plant body to generate electrons; and a cathode electrode disposed in the soil layer to receive the electrons, such that the plant-soil battery is capable of supplying energy for 24 hours a day, is harmless to the environment, can be easily moved and installed, and has an adjustable power generation capacity.

Hereinafter, the present invention will be described in detail.

The plant-soil battery of the present invention includes a plant body, an anode electrode, a soil layer and a cathode electrode.

The plant body forms glucose by photosynthesis, wherein a part of the formed glucose is used for plant respiration, growth, energy storage and the like, while the remaining majority is discharged into soil through roots thereof.

The plant-soil battery of the present invention may generate an electric current by degrading the glucose discharged into the soil layer by microorganisms thus to generate electrons, and then transferring the electrons to the cathode electrode through an electrochemical reaction due to corrosion of the anode electrode.

The plant body of the plant-soil battery according to the present invention may use all kinds of plants without particular limitation thereof so long as they can execute photosynthesis.

However, since the glucose is discharged from the roots of the plant body into the soil, in an aspect of increasing a discharge amount of the glucose which in turn increases a contact volume between the glucose and microorganisms in the anode electrode, plants having lots of fine roots or storage roots are preferably used.

The soil layer is soil in which the plants are planted.

Since the soil layer contains moisture for cultivation of the plants, protons generated at the anode electrode may move to the cathode electrode through the soil layer, as well as the water generated from the cathode electrode may move to the anode electrode.

The soil layer may include a weak acidic electrolyte added thereto. In such a case, the number of the protons contained in the soil layer are increased to enable stably and smoothly generate a current while facilitating growth of the plant body.

The weak acidic electrolyte may be, for example, a weak acidic fertilizer. More particularly, the weak acidic electrolyte may be nitrite fertilizer, phosphate fertilizer, or urea fertilizer, etc., and urine of animals may also be used.

The weak acidic electrolyte is preferably in a liquid state in terms of being able to further facilitate movement of the protons.

Further, the soil layer may further include galactose as well as a leaf extract containing galactosidase.

The leaf extract may have a role of an antioxidant. When adding the weak acidic electrolyte to the soil layer, corrosion of the anode electrode and cathode electrode may be accelerated, and thereby causing a reduction in a lifespan thereof. In this case, the leaf extract may inhibit the above-described corrosion, thus enabling constant generation of current for a longer term than the case of without the leaf extract.

The leaf extract may be obtained by putting leaves in a solvent such as water or ethanol having 1 to 4 carbon atoms followed by heat extraction, but it is not particularly limited thereto.

The leaf extract includes galactosidase. The galactosidase may be inherent in the leaves or further added thereto. The leaves containing inherent galactosidase may be, for example, Maple Leaf, but it is not particularly limited thereto.

When the soil layer includes galactose and the leaf extract includes galactosidase, the galactose is degraded by a mechanism described below to generate electrons, thereby further improving power generation efficiency.

Galactose is generally present in soil. More particularly, galactose may be contained in the soil layer itself or further added thereto.

Additionally, the soil layer may further include blueberries, honey and the like. These materials may have a role similar to the leaf extract, and can be used alone or in combination with the leaf extract.

Additionally, the soil layer may further include livestock manure (solid). In such a case, microorganisms in the soil layer become more abundant to promote degradation of glucose, in turn, generation of electrons, and thereby improving efficiency of the battery.

The livestock manure may be feces of livestock without particular limitation thereof. For example, feces of cattle, pigs, dogs, horses, sheep, chickens, ducks and so on, more particularly, cattle feces may be used.

A content of the livestock manure in the soil layer is not particularly limited, for example, may range from 0.01% by weight ('wt. %') to 100 wt. %.

Even when the content of the livestock manure in the soil layer is 100 wt. % and the soil layer substantially includes the livestock manure, electron generation and/or electron-exchange may actively occur to exhibit excellent efficiency.

In addition, the soil layer may further include an oxidant. In such a case, adsorption of cations on the cathode electrode may be more facilitated.

The oxidant used herein may include, for example, chlorine, bromine, iodine, and the like, but it is not particularly limited thereto. These materials may be used alone or in combination with two or more thereof.

The anode electrode serves to generate electrons, and for this purpose, may include microorganisms to degrade glucose discharged from the plant body thus to generate electrons.

Generation of electrons by the degradation of glucose is performed according to the Reaction Scheme 1 below.

[Reaction Scheme 1]

Anode: $C_6H_{12}O_6 + 6H_2O \longrightarrow 6CO_2 + 24H^+ + 24e^-$

-continued

Galactose $+ O_2 \longrightarrow H_2O_2 +$ Galactose Dialdehyde Derivative

Cathode: $6O_2 + 24H^+ + 24e^- \longrightarrow 12H_2O$ $HO \longrightarrow 2H^+ + O_2 + 2e^-$ The anode electrode according to the present invention may be fabricated using any conventional material known in the related art without particular limitation thereof. For example, silver, copper, chromium, gold, aluminum, lead, zinc, silicon, iron, platinum, manganese, titanium, lanthanum, magnesium, molybdenum, tin, tungsten, nickel, stainless steel and the like may be used. These materials may be used alone or in combination with two or more thereof. In view of electric conductivity, iron, silver, gold, platinum, stainless steel, etc. are preferred, and stainless steel is more preferable in terms of having economic advantages and improved lifespan by corrosion inhibition.

The cathode electrode and the anode electrode may be fabricated using different materials (metals with difference in standard reduction potential values), in order to induce a potential difference therebetween. For example, a material having a low standard reduction potential value may be used for the cathode electrode while a material having a high standard reduction potential value may be used for the anode electrode. In terms of increasing an electromotive force, it is preferable that the electrodes are fabricated so as to have a large difference in the standard reduction potential values. Further, the material of the electrodes may be appropriately selected in consideration of the standard reduction potential value and a degree of oxidation.

Further, the anode electrode according to the present invention may include a carbon material. An electrode including the carbon material has a lower degree of corrosion and abrasion in the soil layer containing moisture than an electrode made of a metal material such as iron, zinc, copper and the like. Therefore, the electrode including a carbon material is friendly to the environment and does not generate additional products due to such corrosion or abrasion. Further, the electrode including a carbon material has a lower degree of oxidation than the metallic electrode, resulting in excellent durability and a very long replacement cycle.

The carbon material may include, for example, carbon felt, carbon paper, carbon cloth, carbon rod and the like, but it is not particularly limited thereto.

It is preferable that the anode electrode has a large surface area to increase electricity generation efficiency, and has a structure of a plate or cylinder shape. In a case of the cylinder shape, a form of the structure may be circle, polygon or any other form without particular limitation thereof so long as the structure has a cross-section of a single looped curve.

Positions of the plant body and the anode electrode are not particularly limited. The plant body may be planted inside, outside, top or bottom of the anode electrode.

It is preferable that the anode electrode has a cylinder shape in terms of increasing a contact area between the microorganisms and glucose. In such a case, it is more preferable that the anode electrode is disposed in the soil layer in such a way that at least a part of the roots of the plant body is located inside the anode electrode. More preferably, the plant body is located so as to be planted in an inner region of a cylinder cross-section of the anode electrode.

Further, it is preferable that the anode electrode has a mesh in order to increase a contact area between the microorganism and glucose, and facilitate movement of oxygen, moisture, etc.

The microorganisms may degrade glucose at the anode electrode to generate electrons, thus being present on the anode electrode or in the vicinity of the anode electrode. The vicinity may be a distance of, for example, 5 cm or less, preferably less than 1 cm, more preferably 5 mm or less, and most preferably 1 mm or less from the anode electrode. Arranging the anode electrode in the soil layer may enable the microorganisms present in the soil layer to be located on the surface or in the vicinity of the anode electrode, or may treat the surface of the anode electrode with alternative microorganisms.

Microorganisms used herein are not particularly limited so long as they can degrade glucose and generate electrons, and may include, for example, *Ssacharomycetic* genus, *Leuconostoc* genus, *Hansenula* genus, *Lactobacillus* genus, *Candida* genus, *Micrococcus* genus, *Streptococcus, Staphylococcus* genus, *Corynebacterium* genus, *Bacillus* genus, *Athrobacter* genus, *Clostridium* genus, *Neisseria* genus, *Escherichia* genus, *Enterobacter* genus, *Achromobacter* genus, *Serratia* genus, *Flavobacterium* genus, *Alcaligenes* genus, *Moraxella* genus, *Acetobacter* genus, *Nitrosomonas* genus, *Thiobacillus* genus, *Nitrobacter* genus, *Gluconobacter* genus, *Xanthomonas* genus, *Pseudomonas* genus, *Vibrio* genus, *Proteus* genus, *Comamonas* genus and the like. Further, any other microorganism, which is known in the related art to degrade the glucose, may also be used.

If necessary, the cathode electrode may be connected with the anode electrode through an external resistance (load), such that electrons generated at the anode electrode can be transferred to the cathode electrode through the external resistance, and protons are also transferred to the cathode electrode to induce a potential difference therebetween, thereby resulting in a current flow.

The cathode electrode according to the present invention may be fabricated using any electrode material known in the related art without particular limitation thereof. For example, silver, copper, chromium, gold, aluminum, lead, zinc, silicon, iron, platinum, manganese, titanium, lanthanum, magnesium, molybdenum, tin, tungsten, nickel, stainless steel and the like may be used alone or in combination with two or more thereof. In view of electric conductivity, iron, silver, gold, platinum, stainless steel, etc. is preferably used and has economic advantages. Further, in terms of improving the lifespan by corrosion inhibition, stainless steel is more preferably used.

Further, the cathode electrode according to the present invention may be an electrode fabricated by including a carbon material. The electrode including a carbon material has a lower degree of corrosion and abrasion in the soil layer containing moisture than the electrode made of a metal material such as iron, zinc, copper and the like. Therefore, the electrode including a carbon material is friendly to the environment and does not generate additional products due to such corrosion or abrasion. Further, the electrode including a carbon material has a lower degree of oxidation than the metallic electrode, thereby resulting in excellent durability and a very long replacement cycle.

Preferably, the electrode including a carbon material, that is, the cathode electrode may be one with surface functional groups subjected to negative ionization. Even in such a case, a potential difference between the above cathode electrode and the anode electrode is increased, thus to further increase a current generation amount. Therefore, even when using the anode electrode including a carbon material, a potential difference may be formed between the cathode electrode and the anode electrode, thus to generate a current.

A process for negative ionization of the surface functional groups is not particularly limited, but may include any method known in the related art, for example, acid treatment, hot treatment, iodine treatment, etc. without particular limitation thereof.

Acids usable for the above treatment may include, for example, hydrochloric acid, nitric acid, sulfuric acid, carbonic acid, phosphoric acid, acetic acid, boric acid and the like, without particular limitation thereof.

The cathode electrode may have a structure of a plate or cylinder shape. In a case of the cylinder shape, a form of the structure may be circle, polygon or any other form without particular limitation thereof so long as the structure has a cross-section of a single looped curve.

When the cathode electrode is formed in a cylinder shape, the cathode electrode preferably surrounds the anode electrode in order to receive electrons generated at the anode electrode side as much as possible and to easily transfer the electrons to the anode electrode as much as possible.

In aspects of the above characteristics, it is preferable that the cathode electrode has a mesh.

Figure 2:
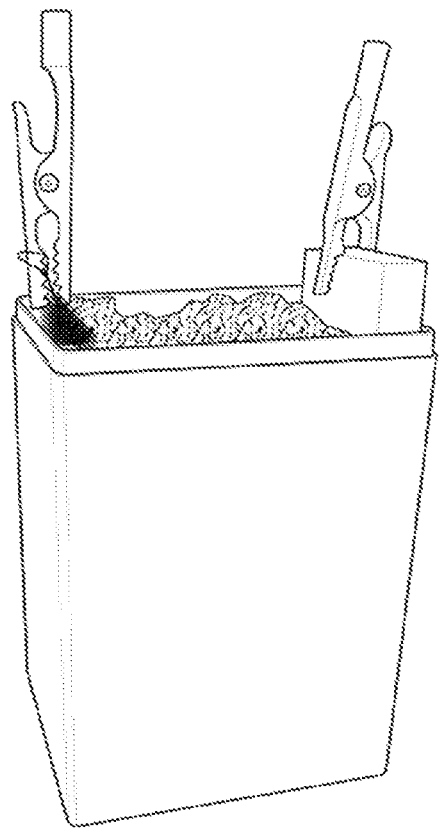
FIG. 2 is a photograph illustrating a plate-shaped anode electrode and a carbon rod-shaped cathode electrode disposed in a soil layer according to another embodiment of the present invention.
Figure 3:
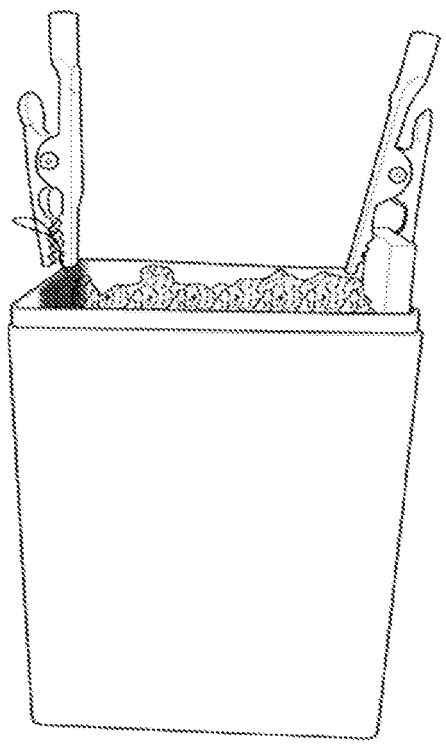
FIG. 3 is a photograph illustrating a plate-shaped anode electrode and a carbon rod-shaped cathode electrode disposed in a soil layer according to another embodiment of the present invention.
Figure 4:
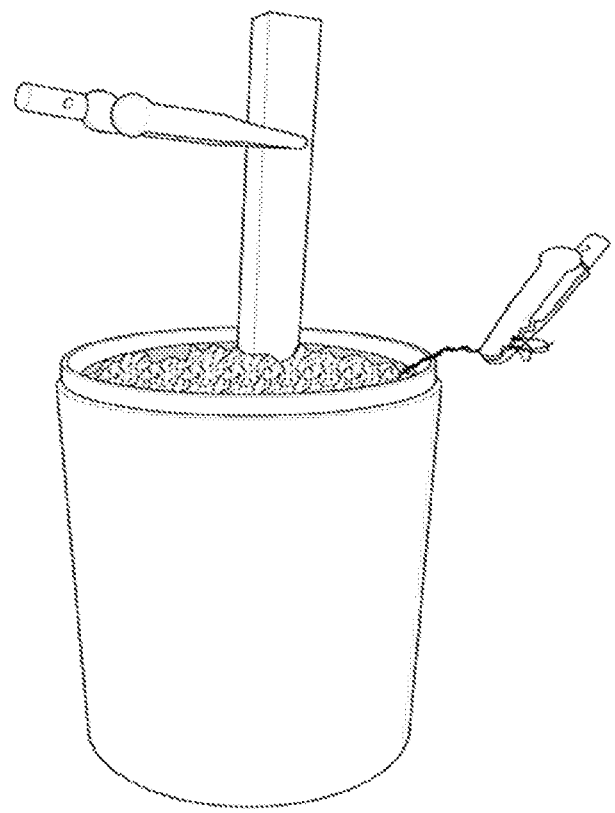
FIG. 4 is a photograph illustrating a mesh-shaped anode electrode and a carbon rod-shaped cathode electrode disposed in a soil layer according to another embodiment of the present invention.

FIGS. 1 to 4 are photographs illustrating a plant-soil battery that includes an iron anode electrode and a carbon rod-shaped cathode electrode (plant not included to simply the illustration). FIGS. 1 to 3 illustrate use of a mesh plate-shaped anode electrode and a carbon rod-shaped cathode electrode; and FIG. 4 illustrates use of a cylinder-shaped anode electrode and a carbon rod-shaped cathode electrode.

When the cathode electrode is in contact with the anode electrode, a short circuit occurs. Therefore, the cathode electrode is located at a predetermined distance spaced apart from the anode electrode. The distance therebetween may range, for example, from 0.5 to 5 cm, but it is not particularly limited thereto. If the distance is less than 0.5 cm, it is difficult to maintain the distance, resulting in short-circuit. If the distance exceeds 5 cm, it is difficult to exchange materials between the anode electrode and the cathode electrode in the above reaction scheme, thus causing a deterioration in current generation efficiency.

Preferably, in the plant-soil battery according to the present invention, the anode electrode and the cathode electrode are in contact with each other with a separation film interposed therebetween. In such a case, a separation distance between the anode electrode and the cathode electrode may be minimized while preventing short circuit therebetween, thereby achieving excellent current generation efficiency.

The separation film may include, for example: cloth such as cotton fabric, knitted fabric, non-woven fabric; or a resin film. According to a specific and preferred embodiment, a non-woven fabric wiper may be used. The non-woven fabric wiper is typically used for cleaning an inside of a semiconductor clean-room, exhibits excellent insulation and anti-static effects to prevent short circuit between the electrodes, and has a very small thickness to minimize a separation distance between the electrodes. The non-woven fabric wiper has an excellent strength, which can be maintained even when moisture is absorbed in soil.

A specific example of commercially available products may be Kim Tech wiper sold by Yuhan Kimberly Co., but it is not particularly limited thereto.

When the anode electrode or cathode electrode has a mesh, it may be difficult to maintain an original shape, an interval, or the like of the mesh, dependent on soil environments or growth of plants in the soil layer. Therefore, the plant-soil battery of the present invention may further include a support wire to surround and support either the anode electrode or the cathode electrode.

Further, the plant-soil battery of the present invention may include a plurality of anode electrodes and cathode electrodes.

Figure 5:
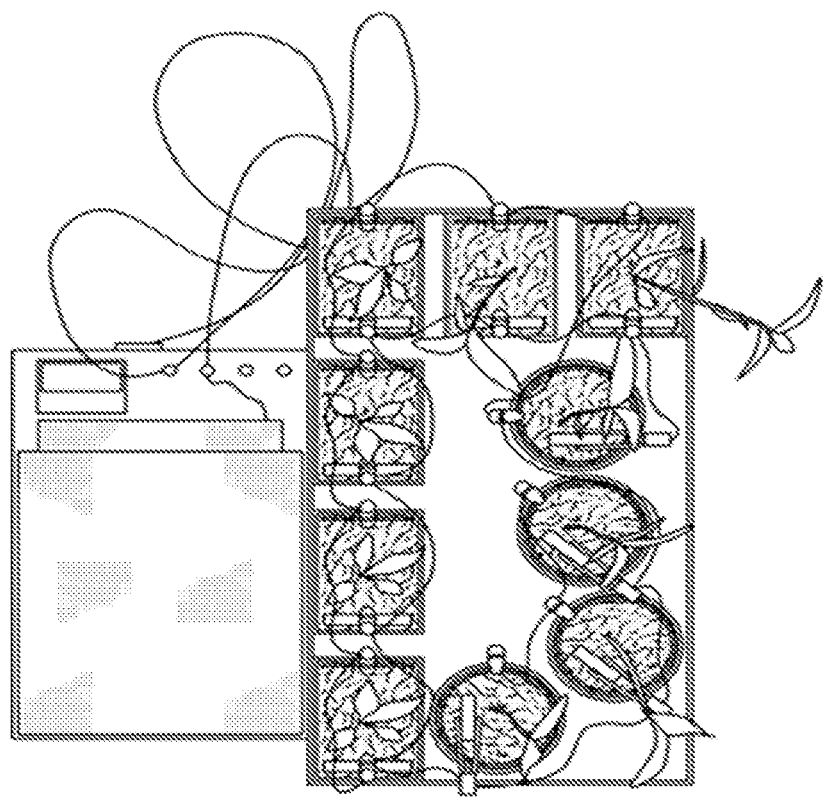
FIG. 5 is a photograph illustrating a circuit formed using the plant-soil battery according to one embodiment of the present invention.

FIG. 5 illustrates one example of using a plurality of anode electrodes and cathode electrodes.

When using a plurality of anode electrodes and cathode electrodes, an anode electrode is located in the innermost, and a cathode electrode, another anode electrode, another cathode electrode, and the like may be located alternately with each other in this order.

In such a case, the plurality of anode electrodes may degrade a greater amount of glucose discharged from the roots of the plant body to generate electrons. Further, since each cathode electrode is located between anode electrodes and each anode electrode is located between cathode electrodes, exchange of glucose degradation products between the electrodes may be smoothly and actively conducted to maximize current generation.

Structures of the anode electrode and the cathode electrode may be ones within the above-described range.

According to another embodiment of the present invention, the plant-soil battery of the present invention may include: a plant body; a soil layer in which the plant body is planted; an anode electrode disposed in the soil layer with being in contact therewith, and including microorganisms which degrade glucose discharged from the plant body to generate electrodes; and a cathode electrode separated from the soil layer by a cation-exchange membrane to receive the electrons.

The plant body, the soil layer and the anode electrode and cathode electrode used herein may be ones within the above-described range.

The cathode electrode is separated from the soil layer by the cation-exchange membrane. As a result, short circuit between the anode electrode and the cathode electrode may be minimized while improving cation-exchange efficiency, and thereby increasing current generation efficiency.

The cation-exchange membrane used herein may include clay, loess, and the like in a solidified form. In an aspect of improving cation-exchange efficiency, cation-exchange membrane may further include an electrolyte added and mixed thereto.

The electrolyte may be mixed and kneaded with clay, loess and the like. The electrolyte useable herein may include typical electrolytes for a battery without particular limitation thereof. For example, ammonium chloride, potassium hydroxide, zinc chloride, and the like may be used. These materials may be used alone or in combination with two or more thereof.

The plant-soil battery of the present invention may further include a first auxiliary soil layer in contact with the anode electrode.

The first auxiliary soil layer may include the above-described weak acidic electrolyte, galactose as well as the leaf extract containing galactosidase, blueberries, honey, livestock manure and the like.

Including the first auxiliary soil layer may further improve the current generation efficiency.

In addition, the plant-soil battery of the present invention may further include a second auxiliary soil layer in contact with the cathode electrode.

The second auxiliary soil layer may include the above-described acid for negative ionization of surface functional groups in the cathode electrode, an oxidant and the like.

Including the second auxiliary soil layer may further increase the potential difference between the cathode electrode and the anode electrode, thereby increasing the current generation amount.

Figure 6:
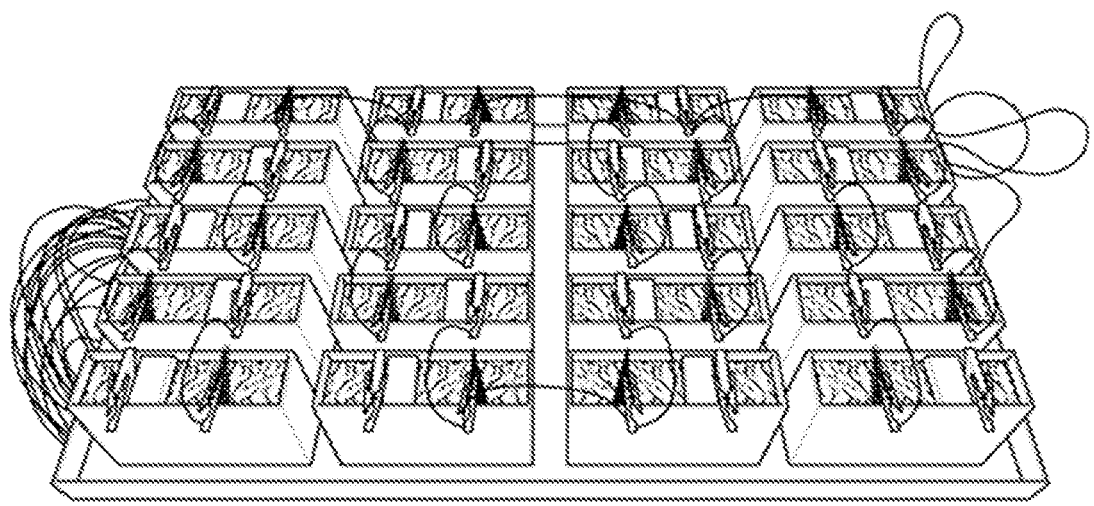
FIG. 6 is a photograph illustrating a plant-soil battery according to one embodiment of the present invention.

As illustrated in FIG. 6, the plant-soil battery including the above-described components of the present invention may have a layered structure in which a first auxiliary soil layer, an anode electrode, a soil layer, a cation-exchange membrane, a cathode electrode, and a second auxiliary soil layer are sequentially laminated in this order.

Hereinafter, the present invention will be described in detail by means of the following examples.

Example 1. Preparation of Plant-Soil Battery

Fragrant daphne was planted in mixed culture soil, that is, green soil and an iron plate-shaped anode electrode was mounted below roots of a plant body.

Thereafter, a copper plate used as a cathode electrode was installed on a lower side of the anode electrode at a distance of 1 cm spaced apart therefrom. Following this, an EIC-108 bread board was used to form a circuit.

Example 2. Preparation of Plant-Soil Battery

Fragrant daphne was planted in mixed culture soil, that is, green soil and a cylindrical iron mesh net with open top and bottom was used as an anode electrode to surround the roots of the fragrant daphne.

Thereafter, a cylindrical copper mesh net with open top and bottom was used as a cathode electrode and disposed in a soil layer, which is located at a distance of 1 cm spaced apart from the anode electrode so as to surround the anode electrode. Following this, an EIC-108 bread board was used to form a circuit.

Example 3. Preparation of Plant-Soil Battery

A plant-soil battery was fabricated according to the same procedures as described in Example 1 except that a carbon rod was used as the cathode electrode.

Example 4. Preparation of Plant-Soil Battery

A plant-soil battery was fabricated according to the same procedures as described in Example 3 except that urine of an animal was added to the green soil.

Example 5. Preparation of Plant-Soil Battery 20 g of maple leaves were placed in 100 ml water at room temperature and immersed therein for 24 hours. Then, the maple leaves were removed to prepare a maple leaf extract. Except that the maple leaf extract was added to the green soil, the same procedures as described in Example 3 were repeated to fabricate a plant-soil battery.

Example 6. Preparation of Plant-Soil Battery

A plant-soil battery was fabricated according to the same procedures as described in Example 4 except that the maple leaf extract obtained by the method described in Example 5 was added to the green soil.

Example 7. Preparation of Plant-Soil Battery

A plant-soil battery was fabricated according to the same procedures as described in Example 3 except that the cathode electrode was immersed in 1.0N nitric acid solution for 1 minute.

Example 8. Preparation of Plant-Soil Battery

A plant-soil battery was fabricated according to the same procedures as described in Example 7 except that urine of an animal was added to the green soil.

Example 9. Preparation of Plant-Soil Battery

A plant-soil battery was fabricated according to the same procedures as described in Example 7 except that the maple leaf extract obtained by the method described in Example 5 was added to the green soil.

Example 10. Preparation of Plant-Soil Battery

A plant-soil battery was fabricated according to the same procedures as described in Example 8 except that the maple leaf extract obtained by the method described in Example 5 was added to the green soil.

Example 11. Preparation of Plant-Soil Battery

A plant-soil battery was fabricated according to the same procedures as described in Example 7 except that a cylindrical iron mesh net with open top and bottom was used as the anode electrode so as to surround the cathode electrode at a distance of 1 cm spaced apart from the cathode electrode.

Example 12. Preparation of Plant-Soil Battery

A plant-soil battery having a layered structure, in which an anode electrode, a soil layer, a cation-exchange membrane and a cathode electrode are sequentially laminated in this order, was fabricated.

The plant body was fragrant daphne, the anode electrode was made of stainless steel, the soil layer was formed of cattle feces, the cation-exchange membrane was clay mixed and kneaded with ammonium chloride, and the cathode electrode was made of carbon felt.

Example 13. Preparation of Plant-Soil Battery

As illustrated in FIG. 6, a first auxiliary soil layer in contact with the anode electrode and a second auxiliary soil layer in contact with the cathode electrode were further included in the plant-soil battery.

Urine of an animal and maple leave extract were added to the first auxiliary soil layer, and nitric acid was added to sand in the second auxiliary soil layer.

Experimental Example. Measurement of Voltage and Current

Using a voltage and current measurement device, that is, a voltammeter, the plant-soil batteries fabricated in the examples were subjected to measurement of voltage and current, results thereof are illustrated in Table 1 below.

TABLE 1

| Section | Voltage (V) | Current (mA) |
| --- | --- | --- |
| Example 1 | 0.850 | 1.0 |
| Example 2 | 0.921 | 1.5 |
| Example 3 | 0.913 | 1.7 |
| Example 4 | 1.039 | 5.8 |
| Example 5 | 1.001 | 2.3 |
| Example 6 | 0.862 | 5.1 |
| Example 7 | 1.691 | 6.5 |
| Example 8 | 1.681 | 8.1 |
| Example 9 | 1.679 | 30 |
| Example 10 | 1.858 | 50 |
| Example 11 | 1.778 | 10.3 |
| Example 12 | 0.9 | 35 |
| Example 13 | 1.1 | 40 |

Referring to the above table, it can be seen that use of the electrode including a carbon material and the mesh-shaped electrode, addition of urine, addition of maple leaf extract, and/or use of the acid-treated carbon electrode may improve voltage and current generation amount.

The invention claimed is:

1. A plant-soil battery, comprising:
a plant body;
a soil layer in which the plant body is planted;
an anode electrode surrounding at least a part of roots of the plant body so that the at least a part of the roots of the plant body is located inside the anode electrode, the anode electrode having a cylindrical shape and disposed in the soil layer with being in contact therewith, and including microorganisms which degrade glucose discharged from the plant body to generate electrons; and
a cathode electrode separated from the soil layer by a cation-exchange membrane to receive the electrons.

2. The plant-soil battery according to claim 1, wherein the soil layer includes livestock manure.

3. The plant-soil battery according to claim 2, wherein the cation-exchange membrane is one selected from the group consisting of clay and loess.

4. The plant-soil battery according to claim 3, wherein the cation-exchange membrane further includes at least one electrolyte selected from the group consisting of ammonium chloride, potassium hydroxide and zinc chloride.

5. The plant-soil battery according to claim 1, further comprising a first auxiliary soil layer, which is in contact with the anode electrode and includes at least one selected from the group consisting of a weak acidic electrolyte, galactose as well as a leaf extract containing galactosidase, blueberries, honey and livestock manure.

6. The plant-soil battery according to claim 1, further comprising a second auxiliary soil layer, which is in contact with the cathode electrode, and includes acid and oxidant.

* * * * *